(12) United States Patent
Lindoff et al.

(10) Patent No.: US 10,645,713 B2
(45) Date of Patent: May 5, 2020

(54) METHOD AND ARRANGEMENT FOR UPLINK TRANSMISSION ADAPTATION

(71) Applicant: Telefonaktiebolaget LM Ericsson (publ), Stockholm (SE)

(72) Inventors: Bengt Lindoff, Bjärred (SE); Joakim Axmon, Kävlinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 457 days.

(21) Appl. No.: 15/301,540

(22) PCT Filed: Jun. 16, 2014

(86) PCT No.: PCT/EP2014/062585
§ 371 (c)(1),
(2) Date: Oct. 3, 2016

(87) PCT Pub. No.: WO2015/149880
PCT Pub. Date: Oct. 8, 2015

(65) Prior Publication Data
US 2017/0026985 A1 Jan. 26, 2017

Related U.S. Application Data

(60) Provisional application No. 61/975,025, filed on Apr. 4, 2014.

(51) Int. Cl.
*H04W 72/12* (2009.01)
*H04L 1/18* (2006.01)
(Continued)

(52) U.S. Cl.
CPC ....... *H04W 72/1215* (2013.01); *H04L 1/0003* (2013.01); *H04L 1/0006* (2013.01);
(Continued)

(58) Field of Classification Search
None
See application file for complete search history.

(56) References Cited

U.S. PATENT DOCUMENTS

2009/0279511 A1   11/2009   Zhu et al.
2010/0290420 A1   11/2010   Dalsgaard et al.
(Continued)

FOREIGN PATENT DOCUMENTS

CN   1462527 A      12/2003
CN   103444104 A   12/2013
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.12.0, Mar. 2014, 1-127.

*Primary Examiner* — Chirag G Shah
*Assistant Examiner* — Srinivasa R Reddivalam
(74) *Attorney, Agent, or Firm* — Murphy, Bilak & Homiller, PLLC (57) ABSTRACT

A method of a wireless communication device is disclosed wherein the wireless communication device comprises a radio transceiver, first (310) and second (330) autonomous radio access control units, and a radio control unit (320). The first and second autonomous radio access control units are adapted to control operation of the wireless communication device in association with a first network node of a first radio access system and a second network node of a second radio access system, respectively, and the radio control unit is adapted to manage time sharing of the radio transceiver by the first and second radio access control units. The method comprises—during use (311) of the radio transceiver by the first radio access control unit—receiving (by the radio control unit) a first message (332) from the second radio (Continued)

access control unit and sending (by the radio control unit) a second message (322) to the first radio access control unit. The first message indicates a timing of an upcoming gap in the use of the radio transceiver by the first radio access control unit, wherein the timing of the upcoming gap is autonomously established (331) by the second radio access control unit. The second message causes adaptation (316) of a planned uplink transmission by the first radio access control unit if (315) a reception by the radio transceiver of an expected response to the planned uplink transmission coincides with the timing of the upcoming gap. Corresponding computer program product, arrangement and wireless communication device are also disclosed.

15 Claims, 2 Drawing Sheets

(51) Int. Cl.
*H04L 1/00* (2006.01)
*H04L 1/16* (2006.01)
*H04W 88/02* (2009.01)

(52) U.S. Cl.
CPC .............. *H04L 1/0015* (2013.01); *H04L 1/18* (2013.01); *H04L 1/1861* (2013.01); *H04L 1/1671* (2013.01); *H04W 88/02* (2013.01)

(56) References Cited

U.S. PATENT DOCUMENTS

| | | |
|---|---|---|
| 2011/0317635 A1 | 12/2011 | Swaminathan et al. |
| 2012/0164948 A1* | 6/2012 | Narasimha ........ H04W 72/1215 455/63.1 |
| 2012/0188907 A1 | 7/2012 | Dayal et al. |
| 2013/0016635 A1* | 1/2013 | Linsky ............. H04W 72/1215 370/280 |
| 2013/0272212 A1 | 10/2013 | Tabet et al. |
| 2013/0272260 A1* | 10/2013 | Bitran .................. H04W 76/10 370/329 |
| 2013/0324113 A1* | 12/2013 | Jechoux ................ H04W 88/06 455/426.1 |

FOREIGN PATENT DOCUMENTS

| | | |
|---|---|---|
| RU | 2450492 C1 | 5/2012 |
| WO | 2010002337 A1 | 1/2010 |
| WO | 2012044329 A1 | 4/2012 |
| WO | 2012099939 A1 | 7/2012 |
| WO | 2013013073 A2 | 1/2013 |
| WO | 2013100910 A1 | 7/2013 |
| WO | 2013154937 A1 | 10/2013 |

* cited by examiner

METHOD AND ARRANGEMENT FOR UPLINK TRANSMISSION ADAPTATION

TECHNICAL FIELD

The present invention relates generally to the field of wireless communication devices where a radio transceiver is shared by first and second radio access control units. More particularly, it relates to handling of gaps in the use of the radio transceiver by the first radio access control unit, wherein the gaps are autonomously established by the second radio access control unit (or vice versa).

BACKGROUND

Figures 1A, 1B, 2:
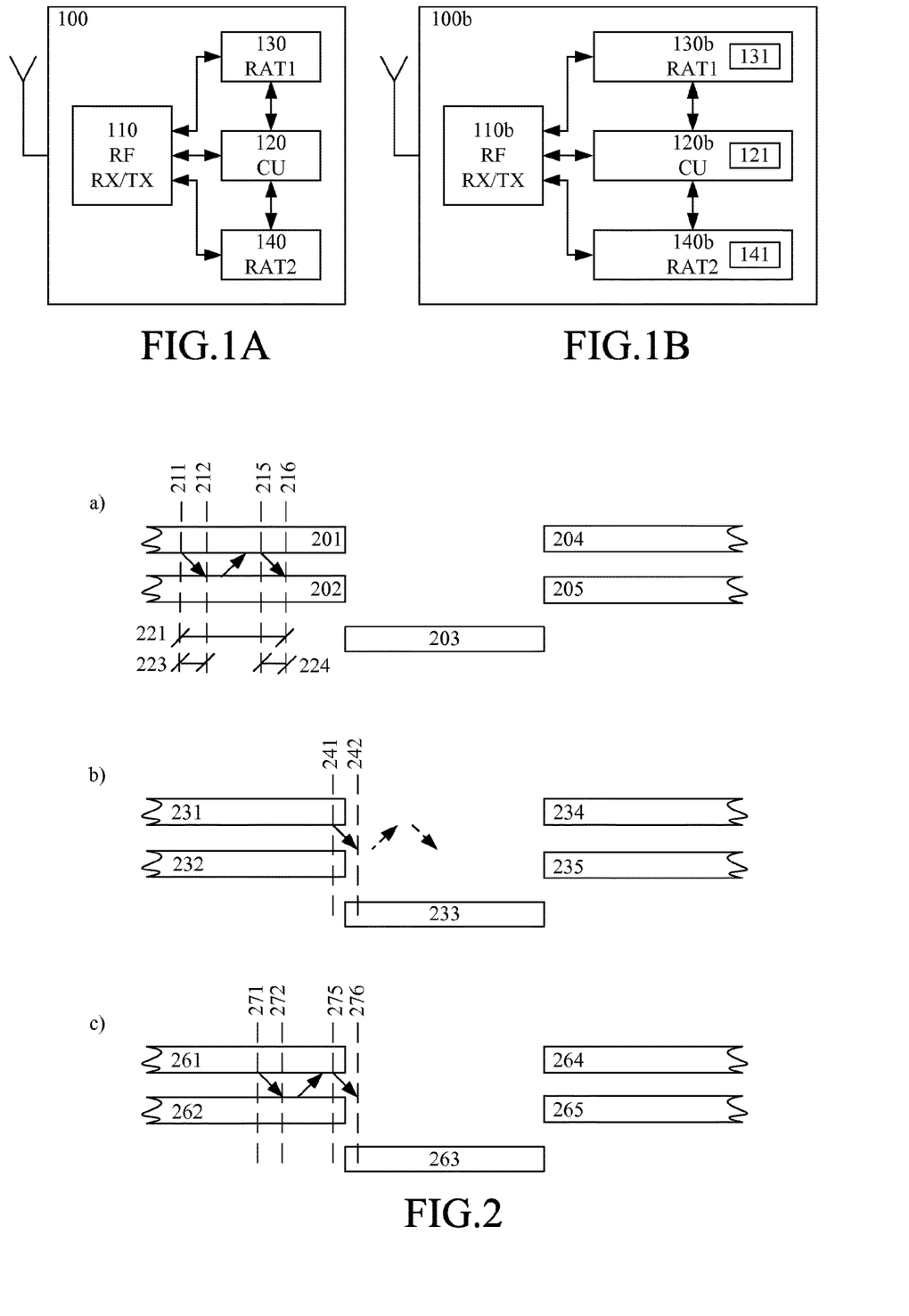
FIGS. 1A and 1B are a block diagrams illustrating example arrangements according to some embodiments.
FIG. 2 is a schematic diagram illustrating example radio transceiver sharing and problems related thereto according to some embodiments.

FIG. 1A schematically illustrates parts of an example wireless communication device 100, wherein a radio transceiver (RF RX/TX) 110 is shared (in time) by first and second radio access control units (RAT1, RAT2) 130, 140. A control unit (CU) 120 manages the time sharing in accordance with requests (with various priorities) from the first and second radio access control units.

In this type of implementation of a wireless communication device, various problems may arise in connection to situations where both radio access control units request access to the radio transceiver for windows of time that (at least partly) overlap. Typically, if such requests are associated with different priorities, the request having the highest priority is granted access to the radio transceiver. If the requests are associated with equal priorities, access to the radio transceiver may be granted in accordance with some suitable sharing algorithm (e.g. round-robin).

The first and second radio access control units may relate to the same or different radio access technologies, the same or different radio access systems, and/or the same or different subscriptions (e.g. implemented by subscription identity modules (SIMs)).

WO 2010/002337 A1 discloses priority handling between a measurement gap procedure and an uplink data transmission procedure in an evolved UTRAN when the the UE may use when performing measurements, i.e. no transmissions, neither uplink nor downlink transmissions, are scheduled during these periods.

A different situation is when the UE autonomously establishes a communication gap which the network will not be aware of. Such situations will be elaborated on more in the following.

In a typical example, a packet switched session (e.g. in accordance with the Universal Mobile Telecommunication Standard—Long Term Evolution (UMTS LTE)) may be ongoing for the first radio access control unit, when a higher priority request to use the radio transceiver is received from the second radio access control unit (e.g. controlling operation in accordance with the Global Standard for Mobile communication (GSM)). A gap in the use of the radio transceiver by the first radio access control unit is then created, which may lead to problems (e.g. decreased throughput, retransmissions, missed scheduling opportunities, etc.) in relation to the packet switched session of the first radio access control unit.

A few situations where gaps in the use of the radio transceiver by the first radio access control unit arise will be described in the following.

Paging

Wireless communication devices (user equipments—UEs) that are idle tune in to the corresponding network node (base station) at predetermined occasions, paging occasions, to check whether they are getting paged by the network. The reason for getting paged may, for instance, be that there is an incoming call for the UE to receive.

While it is in idle mode, the UE is handling the mobility autonomously using neighbor cell information provided by the network. If the current camping cell becomes weak and there is a stronger neighbor cell, the UE will change camping cell to the stronger neighbor. During this—so called—cell reselection, the UE is not monitoring paging and, hence, it may miss if it is getting paged at that moment. To prevent that the paging is missed due to interruption caused by cell reselection, radio access networks are usually repeating the paging one or more times until the UE responds.

All base stations in a so called location (or tracking) area for which the UE has registered are paging the UE. When the UE is reselecting to a cell in another location (or tracking) area, e.g. due to crossing some geographical boundary or changing to another radio access technology, it has to update the network regarding in which area it is via a Location (or Tracking) Area Update procedure. During the time when the UE is updating the location (or tracking) area, the radio access network will have outdated information regarding in which area the UE should be paged. To prevent that the paging is missed due to outdated location information, the radio access network usually repeats the paging in adjacent location (or tracking) areas if the UE does not respond to paging in the registered location (tracking) area.

Gaps in the use of the radio transceiver by the first radio access control unit may arise if the second radio access control unit needs to listen for pages in a paging occasion.

The paging occasions typically follow a so called paging cycle, which is configured by the radio access network node. The paging cycle length also depends on the radio access technology. Some example idle mode paging cycles include:
GSM—471, 706, 942, 1177, 1412, 1648, 1883, 2118 ms
WCDMA—640, 1280, 2560, 5120 ms
TD-SCDMA—640, 1280, 2560, 5120 ms
LTE—320, 640, 1280, 2560 ms
Circuit-Switched Fallback (CSFB)

Circuit switched fallback is an interim solution for supporting voice calls to UEs that are connected to UMTS LTE until VoLTE (voice over LTE, VoIP) and SRVCC (single radio voice call continuity) are supported in the networks.

This feature implicates that the UE can get paged in the UMTS LTE system for an incoming call in a legacy system (e.g. a GSM system), and can then get redirected to the legacy RAT (Radio Access Technology, e.g. GSM). This means that a UE can safely camp on, or be connected to, an UMTS LTE cell without missing any incoming calls.

Typically, the UE gets informed about whether CSFB is supported in the UMTS LTE cell when carrying out a combined registration for CS (circuit switched) and PS (packet switched) services. If CSFB is not supported, the registration will fail. The standard-compliant UE action when CS is not supported is to deactivate the support for UMTS LTE.

CSFB typically requires upgrades of legacy networks. Hence, in areas where UMTS LTE networks are rolled out, there might not always be CSFB support from the beginning. How soon, and whether at all, CSFB will be supported depends on whether the operator is willing to invest in the legacy network.

If CSFB is not supported, gaps in the use of the radio transceiver by the first radio access control unit (e.g. UMTS LTE) may arise if the second radio access control unit (e.g. GSM) needs to listen for pages to allow UMTS LTE camping or connection while (at the same time) camping on a legacy RAT (e.g. GMS) to monitor CS paging.

Simultaneous GSM/LTE (SG-LTE)

SG-LTE is a solution that allows simultaneous GSM and UMTS LTE activities by having two separate radio transceivers and one or two baseband processing units. The UE can be engaged in UMTS LTE data traffic and (at the same time) support a voice call in GSM. Thus, a device supporting SG-LTE does rely on CSFB to allow UMTS LTE camping or connection. SG-LTE can be considered a special case of DSDA (dual SIM dual activity) where both SIMs are from the same operator (physically a single SIM).

Typically, the problems related to gaps in the use of the radio transceiver by the first radio access control unit do not arise in this case.

Simultaneous Voice and LTE (SVLTE)

SVLTE is similar to SG-LTE but more general in that any RAT providing CS and not only GSM can be used for offering CS service in parallel with UMTS LTE PS service.

Typically, the problems related to gaps in the use of the radio transceiver by the first radio access control unit do not arise in this case.

Single Radio-LTE (SR-LTE)

In SR-LTE a single radio transceiver is shared between UMTS LTE and a legacy RAT (e.g. GSM) in a time-division manner. The UE is connected to or camping on UMTS LTE while (at the same time) it is camping on a legacy RAT. When, for example, monitoring paging in the legacy RAT, reading system information, carrying out mobility measurements, doing a location area update, or receiving a call in relation to the legacy RAT, the radio transceiver is handed over to the legacy RAT and any UMTS LTE activities are getting punctured. A device supporting SR-LTE does not rely on CSFB to allow camping on or being connected to UMTS LTE. SR-LTE can be considered a special case of DSDS (dual SIM dual standby) where both SIMs are from the same operator (physically a single SIM).

Gaps in the use of the radio transceiver by the first radio access control unit (e.g. UMTS LTE) may arise if the second radio access control unit (legacy RAT, e.g. GSM) needs to perform any of the tasks exemplified above.

Monitoring Legacy RAT Using Available Additional Receiver

A UE capable of carrier aggregation may use an available receiver otherwise reserved for a secondary component carrier in carrier aggregation to monitor paging, carry out mobility measurements and/or read system information in the legacy RAT. As long as there is large enough separation between UMTS LTE uplink (UL) and legacy RAT downlink (DL) spectrum, the legacy RAT can be received concurrently with UMTS LTE transmissions on the UL. Hence, for this case the legacy RAT can be monitored without any impact on UMTS LTE performance.

Typically, the problems related to gaps in the use of the radio transceiver by the first radio access control unit do not arise in this case.

If the spectral separation between UMTS LTE UL and legacy RAT DL is not sufficient, collisions between UMTS LTE UL transmissions and legacy RAT reception needs to be avoided in order to prevent high energy leaking from the transmitter to the receiver and destroying the signal to be received, or even destroying the LNA (low-noise amplifier) used in the radio transceiver. In many cases, this will mean that UMTS This situation may lead to that the problems related to gaps in the use of the radio transceiver by the first radio access control unit arise.

Depending on capabilities of the baseband and whether dual transmissions can be supported, it may also be possible to support functionality similar to SG-LTE or SVLTE with a single radio with two or more transceivers.

Dual SIM Dual Standby or Activity

In DSDS (dual SIM dual Standby) and DSDA (dual SIM dual activity) the UE is equipped with two SIM cards, and maintains connectivity (potentially) towards two different networks at the same time (typically for different operators).

For DSDA it is required that the UE uses separate radio transceivers for each connection, since, for example, it may use PS services simultaneously for both SIM identities, or PS service for one SIM and CS service for the other SIM. When one of the connections is terminated but the other still is active, the UE will be in idle mode for the SIM identity associated with the terminated connection. While in idle mode, it will monitor paging and carry out mobility management. For power saving reasons it may be attractive to use only one of the receivers in a time-division manner to maintain connectivity towards the first network and monitor paging in the second network (or for second identity in same network).

Thus, gaps in the use of the radio transceiver by the first (active connection) radio access control unit may arise when the second (idle mode) radio access control unit needs to monitor paging or carry out mobility management.

For DSDS it is not necessary to use two radio transceivers since it is assumed that the UE will be active only towards (at most) one network (or for one SIM identity) at any time, and will only monitor paging and carry out mobility management in the other network. With such a solution, DSDS is essentially similar to SR-LTE in that the radio transceiver is used in a time-division manner with puncturing of the ongoing connection when reading paging from the other network.

Thus, gaps in the use of the radio transceiver by the first radio access control unit (with active connection) may arise if the second radio access control unit (in idle mode) needs to perform any of the tasks exemplified above.

Impact of Puncturing on Link Adaptation

For single transceiver solutions, as well as for dual transceiver solutions in the case with too small spectrum separation, the UMTS LTE connection will be punctured, at least partially, during the time of reception in relation to the legacy RAT (or similar).

When puncturing the UMTS LTE connection, there will be an immediate throughput loss due to that scheduled transmissions to and/or from the UE cannot be carried out since the radio transceiver is tuned to another frequency, and also due to that HARQ (hybrid automatic request) acknowledgements (ACKs) for transport blocks received immediately before the gap cannot be transmitted and the base station may consequently retransmit the data although successfully received by the UE.

The puncturing may also have an impact on the residual BLER (block error rate) leading to retransmissions in higher layers (RLC—radio link control). Network vendors are typically using proprietary algorithms for link adaptation (i.e. radio condition dependent selection of transmission mode, modulation, and coding scheme). Typically, the link adaptation algorithms aim at maintaining a particular BLER for the transmitted channels. For instance, for PDSCH (physical downlink shared channel) the target may be 10% and for PDCCH (physical downlink control channel) it may be lower.

When no ACK/NACKs are received despite the UE has been scheduled, when CQI reports are missing, or when no transmissions are done by the UE despite having requested resources via scheduling request, the base station might assume, e.g., that the UE has not been able to decode the control channel (PDCCH), or that the base station has not been able to decode the transmission by the UE (PUCCH (physical uplink control channel) or PUSCH (physical uplink shared channel)). As a result the base station may increasingly use a more robust MCS (modulation and coding scheme) until the target BLER is reached.

For PDCCH this means that fewer control channels can be fitted within a control region of a fixed number of OFDM (orthogonal frequency division multiplex) symbols, or (alternatively or additionally) that the control region will have to be increased at the expense of the data region.

For PDSCH and also for PUSCH, this means that the throughput will be reduced. The throughput reduction is due to that, for a fixed allocation, the number of bits available for transmission may be reduced if falling back from a higher modulation to a lower, i.e. from 16QAM and 64QAM to QPSK and 16QAM respectively. Moreover, for a fixed number of available bits, the ratio of information bits to all available bits may decrease due to back-off, meaning that less information is transmitted and more bits are spent on encoding.

Thus, gaps in the use of the radio transceiver by the first radio access control unit, wherein the gaps are autonomously established by the second radio access control unit may be problematic.

Therefore there is a need for improved handling of gaps in the use of the radio transceiver by the first radio access control unit, wherein the gaps are autonomously established by the second radio access control unit. Preferably, any impact of the gap on performance related to the first radio access control unit is to be minimized, or at least decreased.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved handling of gaps in the use of the radio transceiver by the first radio access control unit, wherein the gaps are autonomously established by the second radio access control unit.

According to a first aspect, this is achieved by a method of a wireless communication device, wherein the wireless communication device comprises a radio transceiver, first and second autonomous radio access control units, and a radio control unit.

The first and second autonomous radio access control units are adapted to control operation of the wireless communication device in association with a first network node of a first radio access system and a second network node of a second radio access system, respectively, and the radio control unit is adapted to manage time sharing of the radio transceiver by the first and second radio access control units.

The method comprises (during use of the radio transceiver by the first radio access control unit) receiving, by the radio control unit, a first message from the second radio access control unit, and sending, by the radio control unit, a second message to the first radio access control unit.

The first message indicates a timing of an upcoming gap in the use of the radio transceiver by the first radio access control unit, wherein the timing of the upcoming gap is autonomously established by the second radio access control unit, and the second message causes adaptation of a planned uplink transmission by the first radio access control unit if a reception by the radio transceiver of an expected response to the planned uplink transmission coincides with the timing of the upcoming gap.

The first and second radio access systems may relate to the same or different radio access technologies, the same or different operators, and/or the same or different telecommunication standards.

The first and second radio access control units are autonomous with regard to each other and the gap established by the second radio access control unit is created without involvement from the first radio access control unit or any of the first and second network nodes.

The first and second radio access control units may, for example, be first and second software stacks, respectively, and/or first and second clients of the radio control unit. The first and second radio access control units may relate to the same or different SIMs.

The radio control unit may, for example, be a radio planner or a radio planning unit.

The indication of the timing of the upcoming gap may, for example, comprise one or more of: a starting time (absolute or relative), an ending time (absolute or relative), and a gap length.

According to some embodiments, the timing of the upcoming gap may be autonomously established by the second radio access control unit to enable one or more of: reception of a paging message from the second network node, reception of system information from the second network node, reception of a data transmission from the second network node, performing a random access procedure with regard to the second radio access system, and performing (by the second radio access control unit) cell measurements. The random access procedure may, for example, be in relation to a location (or tracking) area update. The cell measurements may, for example, comprise cell search, neighboring cell measurements, etc.

In some embodiments, the planned uplink transmission may comprise a scheduling request and the expected response may comprise a scheduling grant.

In some embodiments, the planned uplink transmission may comprise a random access transmission and the expected response may comprise a random access response.

In some embodiments, the planned uplink transmission may comprise a scheduling request being associated with an expected scheduling grant for a hybrid automatic repeat request (HARQ) data transmission, and the expected response may comprise a hybrid automatic repeat request (HARQ) acknowledgement or non-acknowledgement (ACK/NACK).

The adaptation of the planned uplink transmission may comprise cancelling or postponing the planned uplink transmission according to some embodiments.

In some embodiments, the planned uplink transmission may comprise a hybrid automatic repeat request (HARQ) data transmission and the expected response may comprise a HARQ acknowledgement or non-acknowledgement (ACK/NACK).

The adaptation of the planned uplink transmission may comprise one or more of increasing a transmission power of the planned uplink transmission and using an adjusted transport format for the planned uplink transmission according to some embodiments. The adaptation may, in these cases, aim at increasing a robustness of the data transmission such that a probability that it is correctly received (i.e. that an ACK is to be expected) approaches 1. Adjusting the transport format may, for example, comprise using a more robust transport format than called for in normal operation (e.g. as suggested by the channel conditions). In some embodiments where the adaptation of the planned uplink transmission comprises using the adjusted transport format for the planned uplink transmission, the method may further comprise transmitting an indication of the adjusted transport format to the first network node.

The method may, according to some embodiments, further comprise the radio control unit determining whether the reception by the radio transceiver of the expected response to the planned uplink transmission coincides with the timing of the upcoming gap. Then, the second message indicates that the reception by the radio transceiver of the expected response to the planned uplink transmission coincides with the timing of the upcoming gap, and the method may further comprise the first radio access control unit adapting the planned uplink transmission in response to receiving the second message.

Determining whether the reception by the radio transceiver of the expected response to the planned uplink transmission coincides with the timing of the upcoming gap may, in some embodiments, comprise comparing a time until a starting time of the of the upcoming gap with a threshold value (wherein the threshold value is based on a round-trip time between the wireless communication device and the first network node) and determining that the reception by the radio transceiver of the expected response to the planned uplink transmission coincides with the timing of the upcoming gap if the time until the starting time of the of the upcoming gap is lower than the threshold value. The threshold value may, for example, be set to the round-trip time, to the round-trip time plus a processing delay of the first network node, to the round-trip time plus a delay due to scheduling of other wireless communication devices, or to any suitable combination thereof.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

According to a third aspect, an arrangement for a wireless communication device is provided, wherein the wireless communication device comprises a radio transceiver and first and second autonomous radio access control units.

The first and second radio access control units are adapted to control operation of the wireless communication device in association with a first network node of a first radio access system and a second network node of a second radio access system, respectively.

The arrangement comprises a radio control unit adapted to manage time sharing of the radio transceiver by the first and second radio access control units and to (during use of the radio transceiver by the first radio access control unit) receive a first message from the second radio access control unit and send a second message to the first radio access control unit.

The first message is indicative of a timing of an upcoming gap in the use of the radio transceiver by the first radio access control unit, wherein the timing of the upcoming gap is autonomously established by the second radio access control unit, and the second message is adapted to cause adaptation of a planned uplink transmission by the first radio access control unit if a reception by the radio transceiver of an expected response to the planned uplink transmission coincides with the timing of the upcoming gap.

In some embodiments, the radio control unit may be further adapted to determine whether the reception by the radio transceiver of the expected response to the planned uplink transmission coincides with the timing of the upcoming gap. Then, the second message may indicate that the reception by the radio transceiver of the expected response to the planned uplink transmission coincides with the timing of the upcoming gap.

According to some embodiments, the arrangement may further comprise the first and second radio access control units.

The first radio access control unit may be further adapted to adapt the planned uplink transmission in response to receiving the second message.

The arrangement may further comprise the radio transceiver in some embodiments.

A fourth aspect is a wireless communication device comprising the arrangement according to the third aspect.

In some embodiments, the third and fourth aspects may additionally have features identical with or corresponding to any of the various features as explained above for the first aspect.

An advantage of some embodiments is that an impact on performance due to autonomously established gaps may be minimized (or at least decreased).

Another advantage of some embodiments is that a wireless communication device will not request uplink resources that it will not be able to use due to radio transceiver conflicts.

Yet another advantage of some embodiments is that a system throughput may be increased.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a wireless communication device may adapt its uplink transmissions in response to an indication aim at limiting any impact of such gaps autonomously established by the wireless communication device.

As will be understood, embodiments may be particularly suitable for use in a device having an architecture such as the example wireless communication device 100 of FIG. 1A or the example wireless communication device 100*b* of FIG. 1B, wherein the first and second radio access control units 130, 140 are adapted to control operation of the wireless communication device in association with a first network node of a first radio access system and a second network node of a second radio access system, respectively, and wherein the radio control unit 120 is adapted to manage time sharing of the radio transceiver 110 by the first and second radio access control units 130, 140. FIG. 1B will be described in more detail in connection with FIG. 3 below.

Some embodiments relate to a wireless communication device (UE) and corresponding methods. The device comprises a radio transceiver (compare with 110 of FIG. 1A) that may be shared for communication with a first radio access system, RAS1 and a second radio access system, RAS2, which in turn are served by network nodes. A control unit of the device (compare with 120 of FIG. 1A) controls the operation of the radio transceiver, and is configured to generate interrupts (gaps) of the radio communication relative to RAS1 for allowing radio communication relative to RAS2, to allow for downlink reception including, for instance, measurements and paging. The control unit is further configured to adapt the uplink transmission in RAS1 to mitigate possible adverse effects of the interrupt on the radio communication relative to RAS1.

An example of scheduling on the uplink will now be described, that illustrates some of the problems related to transmission/reception gaps. In this typical example, the UE indicates to the eNB (evolved NodeB) via an SR (scheduling request) when it needs resources to transmit on the uplink. It is configured with periodic opportunities to signal such a request to the eNB, and can do so every 1, 2, 5, 10, 20, 40 or 80 ms depending on the configuration (see e.g. Third Generation Partnership Project Technical Specification—3GPP TS—36.213). The SR can be handled by the eNB as soon as it is received but due to scheduling of other UEs it might not get granted immediately. Once granted the UE receives an SG (scheduling grant) on PDCCH, which is valid for transmission on the uplink 4 sub frames later. Furthermore, in case the device has a valid uplink grant, it can transmit a scheduling request multiplexed in the PUSCH. Requested and granted but unused, uplink allocations may indicate to the base station that either the UE was not able to decode PDCCH, or the eNB was not able to decode PUSCH (or PUCCH, if SR was transmitted on that channel). Either way it may have an impact on throughput both on user and on system level.

Introducing autonomous gaps for legacy RAT handling, as discussed above, may affect the throughput performance of UMTS LTE. Some prior art solutions try to use all available sub frames until the gap starts since, from a naïve point of view, this seems to be the best approach. However, due to the delay between, say, scheduling request and scheduling grant, a SR may be transmitted but the SG and the actual PUSCH transmission may be in the autonomous gap created, and as mentioned above. Then, the eNodeB may make an erroneous conclusion about why the error occurred and this may degrade the further communication in an undesirable way.

FIG. 2 also illustrates a few examples related to uplink transmission in connection with a transmission/reception gap. In FIG. 2, time runs from left to right.

The scenarios in FIG. 2 may arise for a wireless communication device such as the wireless communication device 100 of FIG. 1A when the radio transceiver 110 is used by the first radio access control unit 130 and the second radio access control unit 140 establishes a gap in the use of the radio transceiver by the first radio access control unit (e.g. to be able to read paging, perform measurements, etc. as elaborated on above).

Use of the radio transceiver 110 by the first radio access control unit 130 is illustrated in FIG. 2 by the blocks 201, 204, 231, 234, 261, 264 (uplink—UL) and by the blocks 202, 205, 232, 235, 262, 265 (downlink—DL). Use of the radio transceiver 110 by the second radio access control unit 140 (and, thus, gaps in the use by the first radio access control unit 130) is illustrated in FIG. 2 by the blocks 203, 233, 263 (typically DL monitoring).

Part a) of FIG. 2 illustrates a scheduling request (SR) transmitted by the device at time 211 and a corresponding scheduling grant (SG) received by the device at time 212. The time between transmission of the SR and receipt of the corresponding response is illustrated by 223.

Part a) of FIG. 2 also illustrates a data transmission by the device at time 215 and a corresponding acknowledgement—ACK (or non-acknowledgement—NACK) message received by the device at time 215. The time between transmission of the data and receipt of the corresponding ACK/NACK is illustrated by 224.

The time 215 of the data transmission is typically as granted in the SG received at time 212. The time between transmission of the SR and the receipt of ACK/NACK for the data causing the SR is illustrated by 221.

The durations of 223 and 224 are typically dependent on the round-trip time between the device and the first network node, and may or may not also depend on a processing time at the first network node. The duration of 221 is typically dependent on the round-trip time between the device and the first network node, and may or may not also depend on a processing time at the first network node. The duration of 221 is typically also dependent on when the first network node schedules the device (e.g. due to scheduling of other devices by the first network node).

Part b) of FIG. 2 illustrates a scheduling request (SR) transmitted by the device at time 241. As can be seen, receipt of a corresponding scheduling grant (SG) is to be expected at time 242, which is during the gap in the use of the radio transceiver by the first radio access control unit. This is because, when the SR is transmitted at time 241, the time remaining until the gap starts is less than the time between transmission of the SR and the expected receipt of the corresponding response (compare with 223 of part a)).

The time between transmission of the SR and the expected receipt of the corresponding response may be seen as a first threshold (t0) and may be used to determine a latest allowed transmission time for SR. Embodiments disclosed herein suggest that in situations like the one illustrated in part b), the transmission of the SR is postponed or completely cancelled. Similar considerations may also be applicable to random access transmissions and responses.

Part c) of FIG. 2 illustrates a scheduling request (SR) transmitted by the device at time 271, a corresponding scheduling grant (SG) received by the device at time 272, and a corresponding data transmission by the device at time 275. As can be seen, receipt of a corresponding ACK/NACK is to be expected at time 276, which is during the gap in the use of the radio transceiver by the first radio access control unit. This is because, when the data is transmitted at time 275, the time remaining until the gap starts is less than the time between transmission of the data and the expected receipt of the corresponding ACK/NACK (compare with 224 of part a)). This is, in turn, due to that, when the SR is transmitted at time 271, the time remaining until the gap starts is less than the time between transmission of the SR and the expected receipt of the ACK/NACK for the data causing the SR (compare with 221 of part a)).

The time between transmission of the SR and the expected receipt of the ACK/NACK for the data causing the SR may be seen as a second threshold (t0') and may be used to determine a latest allowed transmission time for SR. The time between transmission of the data and the expected receipt of the corresponding ACK/NACK may be seen as a third threshold (t0″) and may be used to determine a latest time for un-adjusted data transmission. Embodiments disclosed herein suggest that in situations like the one illustrated in part c), the transmission of the SR may be postponed or completely cancelled, or the data transmission may be adjusted to be more robust (e.g. by increasing the transmission power and/or using a more robust transmission format—coding and/or modulation) to increase the probability of a corresponding ACK and preferably have this probability approaching 1.

Figure 3:
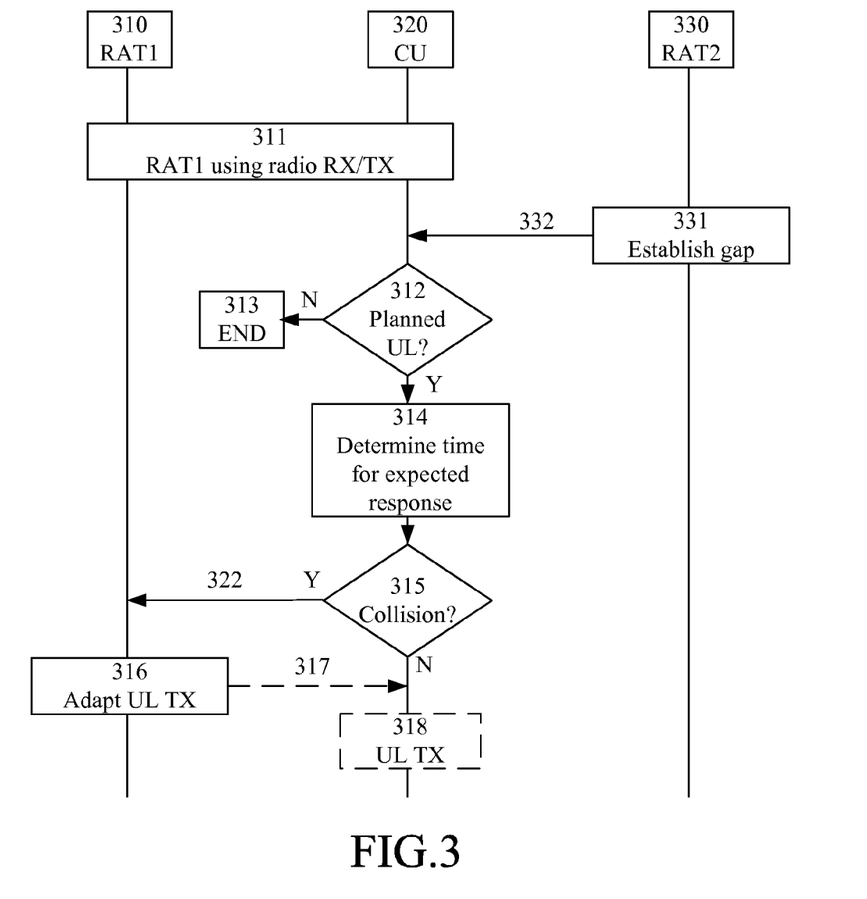
FIG. 3 is a combined flowchart and signaling diagram illustrating example method steps and signals according to some embodiments.

FIG. 3 illustrate an example method and corresponding signaling between a control unit (CU) 320 (compare with 120 of FIG. 1A) and first and second radio access control units (RAT1, RAT2) 310, 330 (compare with 130, 140 of FIG. 1A). The method may, for example, be performed by the wireless communication device 100 of FIG. 1A. Thus, the method of FIG. 1A may be performed by wireless communication device wherein the wireless communication device comprises a radio transceiver, the first and second radio access control units 310, 320, and the radio control unit 320.

The first and second radio access control units 310, 320 are adapted to control operation of the wireless communication device in association with a first network node of a first radio access system and a second network node of a second radio access system, respectively, and the radio control unit 320 is adapted to manage time sharing of the radio transceiver by the first and second radio access control units.

The method is performed during use of the radio transceiver by the first radio access control unit as illustrated by block 311 of FIG. 3.

The method starts with that a gap (interruption) in the use of the radio transceiver by the first radio access control unit is autonomously established by the second radio access control unit in step 331. As elaborated on above, the gap may be to enable downlink reception for the system related to the second radio access control unit. For example, the gap may be established to enable one or more of: reception of a paging message from the second network node, reception of system information from the second network node, reception of a data transmission from the second network node, performing a random access procedure with regard to the second radio access system, and performing cell measurements by the second radio access control unit.

The second radio access control unit sends a first message 332 to the radio control unit, the first message indicating a timing of the upcoming gap in the use of the radio transceiver by the first radio access control unit.

When the first message is received by the radio control unit, it determines (in step 312) whether or not any uplink transmissions are planned (needed) in relation to the first radio access control unit. Depending on the implementation, the radio control unit 320 may have direct control of the first radio access control unit 310 or may have to ask it about the timing of any future uplink transmissions. If no such uplink transmissions are planned (N-path out from step 312) the process ends in step 313 and the gap is executed without further considerations. If such uplink transmissions are planned (Y-path out from step 312) the process continues to step 314, where the radio control unit determines the time of reception of an expected response to the planned uplink transmission.

The planned uplink transmission may be a scheduling request, a random access transmission, and/or a (HARQ) data transmission, or similar.

The expected response is typically a reaction by the network node on the planned uplink transmission (e.g. a scheduling grant, a random access response, a (HARQ) ACK/NACK, or similar).

In step 315, the radio control unit determines whether or not the time of reception of the expected response coincides (collides) with the timing of the gap. In some embodiments, this determination may be made by comparing a time until a starting time of the of the upcoming gap with a threshold value and determining that the reception of the expected response coincides with the timing of the gap if the time until the starting time of the of the upcoming gap is lower than the threshold value. The threshold value may be based on a round-trip time between the wireless communication device and the first network node (compare with 221, 223, 224 of FIG. 2).

If there is no collision (N-path out from step 315) the uplink transmission (UL TX) may be carried out without further considerations in step 318. If there is a collision (Y-path out from step 315), the radio control unit sends a second message 322 to the first radio access control unit.

The second message is indented to cause suitable adaptation of the planned uplink transmission by the first radio access control unit. When the first radio access control unit receives the second message, it adapts the uplink transmission in step 316, and the uplink transmission is carried out in step 318 after the radio control unit has received information 317 about the adaptation.

The adaptation of the planned uplink transmission in step 316 may, for example, comprise cancelling or postponing the planned uplink transmission (e.g. scheduling request, random access). Alternatively or additionally, the adaptation of the planned uplink transmission in step 316 may, for example, comprise increasing a transmission power of the planned uplink transmission and/or using an adjusted transport format for the planned uplink transmission (e.g. HARQ data transmission). If the transport format for the planned uplink transmission is adjusted, an indication of the adjusted transport format may be transmitted to the first network node.

FIG. 1B illustrate an example arrangement of a wireless communication device 100b particularly suitable to carry out the method of FIG. 3. The general description of the radio transceiver 110, the radio control unit 120, and the first and second radio access control units 130, 140 presented above for FIG. 1A is applicable also to the radio transceiver 110b, the radio control unit 120b, and the first and second radio access control units 130b, 140b of FIG. 1B.

The second radio access control unit 140b comprises a gap establisher 141, which may, for example, be adapted to perform step 331 of FIG. 3. The radio control unit 120b comprises a determiner 121, which may, for example be adapted to perform steps 312, 314 and 315 of FIG. 3. The first radio access control unit 130b comprises an uplink transmission adapter 131, which may, for example, be adapted to perform step 316 of FIG. 3.

According to some embodiments, the device restricts UL information (scheduling request, for instance) prior to an autonomous gap, a reaction of which (scheduling grant, for instance) from the network (NW) node may take place in the gap when the device/UE is unable to respond. A control unit in the device having knowledge of the gap timing restricts possible UL transmissions that may cause NW node reaction/response to collide with the autonomously created gap.

According to some embodiments, the device may additionally or alternatively adapt UL transmission in order to reduce possible impact a NW node reaction in a created gap may have on the overall throughput performance. An example of such adaptation may be to increase TX power or change transmission format to a more robust coding of PUSCH and thereby assume an ACK is transmitted on PHICH, since the UL has been made more robust (if the HARQ response may be transmitted from the NW node in an autonomous created gap).

In the description below (any also in many places otherwise herein), UMTS LTE is used as an example of the primary (connected) RAT and GSM is used as an example of the secondary RAT (needing gaps for paging reception, for instance). However, these cases/RATs are not to be understood as limiting.

Furthermore, the term UE is used, but various embodiments are equally applicable to any kind of cellular communication device (e.g. sensors, laptops, modems, machine-type communication (MTC) devices, smartphones, etc.).

As elaborated on above, FIG. 2, part a) may be used to exemplify some general principles behind the need for adaptation in relation to the UE created autonomous gaps for DL monitoring of a second RAT.

In an example related to FIG. 2, part a), the UE is connected to a NW node using a first RAT (UMTS LTE, for example). During periodical gaps (of length typically 5-20 ms) the UL or DL is interrupted for DL monitoring of another RAT 2 (that may, for example, be operated by another subscription, SIM 2). The monitoring may, typically, be monitoring for paging messages or DL signal strength measurement. The monitoring may comprise DL monitoring that the device can not change the timing of During this gap, no UL/DL connection is possible with the NW node, and since the gap is autonomously created by the UE, the NW does not know about this gap. Hence, possible DL transmission missed by the UE may be compensated, relying on HARQ retransmissions, as discussed above.

In a more general sense relating to some embodiments, the interrupts may be time gaps relative to RAS1, autonomously created by the wireless communication device to allow downlink reception (including, for instance, measurements, paging reception, and/or system information reading measurements) and/or for device-to-device (D2D) transmission in an UL NSPS (National Security and Public Safety) band or other cellular or unlicensed frequency bands where UMTS LTE D2D transmission may take place.

FIG. 2, part a) may also be used as an illustration of the principles of UL transmission in UMTS LTE. In a related example, the device first transmits a scheduling request (SR, compare with 211). The NW node then responds, typically within 6-10 ms, with a Scheduling Grant (SG, compare with 212) in the DL, valid for an UL transmission 4 ms later (compare with 215). An HARQ ACK/NACK response is then expected 4 ms later (for frequency division multiplex—FDD) or (for time division multiplex—TDD) 4 ms or next DL subframe thereafter (compare with 216).

FIG. 2, part b) may be used as an illustration of principles for some embodiments. Due to the inherent delay between SR and reception of SG and/or between data transmission and HARQ ACK/NACK, a SR transmitted too close to the gap/interrupt (compare with 241), will make the device miss the SG and hence the UL transmission resource allocation (or in some embodiments only the possibility to transmit the UL data packet). Therefore, in these embodiments, the device—knowing the timing for the autonomous gaps, as well as having either perfect knowledge of timing (SG—UL data timing, UL data—ACK/NACK timing) or very good knowledge of timing (SR—SG), knows which is the latest time instant when a SR can be transmitted prior to a gap, such that a corresponding NW reaction may be finalized prior to the gap start. With application of some of the proposed embodiments, the gap will not create any interruptions in the UL data transmission that need to rely on RLC retransmissions, etc. for being solved. This typically leads to that better quality of service (QoS) is achieved in the UL.

Some embodiments also cover the case of discarding random access (RA) transmissions if the timing for the corresponding random access response (RAR) window (i.e. the time window for receiving a NW node response to the RA, which can be in the range of 5-20 ms), at least in part, overlaps with the gap autonomously configured by the UE. The timing for the RAR relative a RA is typically well known to the UE since it is signaled from the NW node in the connection setup or is broadcasted in the MIB/SIB (master/system information block).

Some embodiments of the invention generally account for generic signaling requests associated with network reaction timing that may be known or predicted by the UE including UMTS LTE SR and Random Access transmissions described above.

FIG. 2, part c) may be used as an illustration of some embodiments of the invention. In this example, the SG may have been received with a delay until data may be transmitted (for instance, due to heavy load in the cell) and the ACK/NACK may not be able to be received prior to the gap start. In this example, the device may adapt the UL transport format (TF) and/or the UL power, so that the risk for erroneous detection in the NW node is minimized (i.e. P(ACK)=1 or close thereto). The reference TX power and the transport format to use for the HE is typically set or indicated by the NW node in the scheduling grant, and in this example the idea is to adapt the TX power and/or the TF from these indicated reference points. Then, the UE may assume that the packet is correctly received without the need for a retransmission. The example according to some embodiments further includes means for the UE to indicate to the eNB that it has fallen back to a more robust encoding, either according to a prior determined pattern known by both nodes, or according to an explicitly stated MCS. In an alternative example, the base station blindly detects that the UE has fallen back to a more robust MCS, either according to a prior determined pattern known by both nodes or according to an MCS fully decided by the UE which has to be detected by the base station without any guidance.

In one example, the device determines a need for UL transmission (compare with step 312 of FIG. 3). A control unit determines time instants for NW reactions associated with the forthcoming UL transmission (for instance reception of SG, reception of HARQ ACK/NACK) (compare with step 314 of FIG. 3). The control unit then determines whether these NW reactions will collide with further autonomous gaps created by the UE (compare with step 315 of FIG. 3). If not (compare with N-path out from step 315), UL transmission is made. However, if a collision is detected (compare with Y-path out from step 315) the UL transmission is adapted (compare with step 316 of FIG. 3), wherein the adaptation may be according to any of the examples as described above.

The thresholds (t0, t0', t0", 223, 224, 221) applied according to some embodiments may depend on the various NW reactions, and may also vary in accordance with them, as discussed in detail above. Typically, the thresholds basically mean the minimum time before an interrupt where the UL transmission may be performed by the default method of the respective RAS.

As elaborated on above, FIGS. 1A and 1B show block diagrams of a wireless communication device (UE) according to some embodiments. It should be noted that only parts relevant to the various embodiments are shown, as may be understood by a skilled person.

These figures may be used to illustrate the following example according to some embodiments. The device comprises a radio transceiver (compare with 110, 110b) which is common for radio communication with different radio access systems, RAS1 and RAS2, which generally can be of the same or different access technology (RAT) and/or different subscriptions or (U)SIMs. The radio transceiver is controlled by a control unit (compare with 120, 120b), either directly or through respective parts for the respective radio access system, RAT1 Unit and RAT2 Unit (compare with 130, 130b, 140, 140b). If the RAT1 Unit and the RAT2 Unit are implemented as separate parts, they are configured to send control information about interrupt/gap timing between them, if and as necessary.

The following first list represents a few illustrative examples according to some embodiments:
1. Method and apparatus for adapting an UL transmission from a device connected to (served by) a NW node using a first RAT comprising the steps of
   a. Based on an UL transmission determined to be needed, determine a first future time period the UL transmission will create a reaction/response from a NW node
   b. Determine whether that first future time period collides with a second future time period where an, by the device generated interrupt of UL or DL communication to the NW node using first RAT, is being performed
   c. And if collision detected, adapt the UL transmission.
2. Example 1 and UL transmission is transmission including a Scheduling Request (SR) (either in PUSCH or PUCCH) and adaptation is to discard the SR.
3. Example 1 and UL transmission is a PUSCH transmission, and adaptation is increasing Transmit power above a target level or changing transport format to a more robust TF.
4. Any of the examples 1-3 and where the gap is an Autonomous gap created by the UE used for radio reception action (paging/measurement) on a second RAT.
5. Any of the examples 1-4 and where the reaction from a NW node is at least one of transmitting a Scheduling Grant associated from the UE transmitted SR, transmitting an HARQ ACK/NAK associated to a transmitted data packet from the UE.

The following second list represents a few illustrative examples according to some embodiments:
1. A wireless communication device (UE) comprising: a radio transceiver that may be shared for communication with a first radio access system, RAS1 and second radio access system, RAS2; RAS1 and RAS2 being served by network nodes; and a control unit for control of the operation of the radio transceiver, the control unit being configured to generate interrupts of the radio communication relative to RAS1 for allowing radio communication relative to RAS2, wherein the control unit is configured to adapt the uplink transmission in RAS1 to mitigate possible adverse effects of the interrupt on the radio communication relative to RAS1.
2. A wireless communication device according to item 1, wherein the interrupts are time gaps relative to RAS1 created by the wireless communication device to allow downlink reception including for instance measurements, paging reception and system information reading or to allow for D2D transmission in UL NSPS band relative to RAS2.
3. A wireless communication device according to item 1 or 2, wherein the control unit is configured to determine the time before an interrupt, and, if the time before an interrupt is less than a threshold (t0), configured to adapt the timing or transmission of a signaling request relative to RAS1 to account for reaction/response times of the network node in RAS1.
4. A wireless communication device according to item 3, wherein the signaling request is a Scheduling Request (LTE SR) with associated network reaction/response times (e.g. for Scheduling Grant and HARQ ACK/NACK responses).
5. A wireless communication device according to item 4, wherein the adaptation is to discard the Scheduling Request.
6. A wireless communication device according to item 3, wherein the signaling request is a LTE Random Access Transmission, with associated network reaction/response times (for example to account for the timing of the Random Access Response (RAR) window).
7. A wireless communication device according to item 6, wherein the adaptation is to discard the Random Access Transmission.
8. A wireless communication device according to any one of items 1 to 7, wherein if the uplink transmission in RAS1 is a LTE PUSCH transmission and if the time before an interrupt is less than a threshold (t1), the adaptation involves increasing the transmit power above a target level.
9. A wireless communication device according to any one of items 1 to 8, wherein if the uplink transmission in RAS1 is a LTE PUSCH transmission and if the time before an interrupt is less than a threshold (t2), the adaptation further involves increasing the robustness of the transport format.
10. A wireless communication device according to item 9, wherein the device is configured to indicate to the network of RAS1 that it has fallen back to a more robust encoding.
11. A wireless communication device according to any one of items 1 to 10, wherein the control unit comprises separate parts (RAT1 Unit; RAT2 Unit) for control of RAS1 and RAS2, and the RAS2 control part is configured to send control information about interrupt/gap timing to the RAS1 control part.
12. A wireless communication device according to any one of items 1 to 11, wherein RAS1 and RAS2 are one of: different radio access technologies (RAT), e.g. RAS1 is LTE and RAS2 is a legacy radio access technology, such as GSM, or different subscriptions, such as with different associated (U)SIMs.
13. A method for controlling wireless communication device according to any one of items 1 to 12.

To conclude one basic principle of some of the embodiments presented herein is that the device restricts UL information (scheduling request, for instance) prior to an autonomously created gap, to which a reaction (scheduling grant, for instance) from the NW node may take place in a gap when the device is unable to respond. A control unit in the device having knowledge of the gap timing restricts possible UL transmissions that may cause a NW node reaction/response which collides with the autonomously created gap.

The examples and embodiments disclosed herein use the presumption that the gap is established by the second radio access control unit and that it is a gap in use of the radio transceiver by the first radio access control unit. Naturally, the opposite situation (that the gap is established by the first radio access control unit and that it is a gap in use of the radio transceiver by the second radio access control unit) may be equally applicable in various situations.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a user equipment, a mobile telephone, a pager, a communicator, an electronic organizer, a smartphone, a computer, a notebook, or a mobile gaming device.

Figure 4:
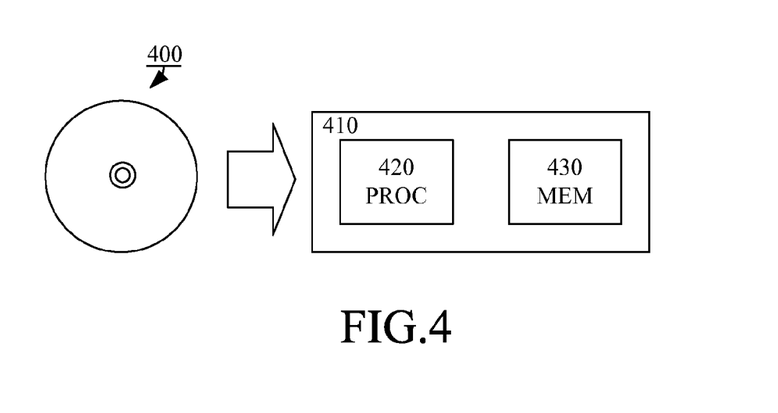
FIG. 4 is a schematic drawing illustrating an example computer program product according to some embodiments.

According to some embodiments, a computer program product comprises a computer readable medium such as, for example, a diskette, a USB-stick, a plug-in card, an embedded drive or a CD-ROM (such as the CD-ROM 400 illustrated in FIG. 4). The computer readable medium may have stored thereon a computer program comprising program instructions. The computer program may be loadable into a data-processing unit (PROC) 420, which may, for example, be comprised in a wireless communication device 410. When loaded into the data-processing unit 420, the computer program may be stored in a memory (MEM) 430 associated with or integral to the data-processing unit 420. According to some embodiments, the computer program may, when loaded into and run by the data-processing unit, cause the data-processing unit to execute method steps according to, for example, the method shown in FIG. 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The following list represents a few illustrative examples according to some embodiments:

1. A method of a wireless communication device wherein the wireless communication device comprises:

a radio transceiver (110);

first (130, 310) and second (140, 330) autonomous radio access control units, wherein the first and second radio access control units are adapted to control operation of the wireless communication device in association with a first network node of a first radio access system and a second network node of a second radio access system, respectively; and a radio control unit (120, 320) adapted to manage time sharing of the radio transceiver by the first and second radio access control units;

the method comprising, during use (311) of the radio transceiver by the first radio access control unit:

receiving, by the radio control unit, a first message (332) from the second radio access control unit, the first message indicating a timing of an upcoming gap (203, 233, 263) in the use of the radio transceiver by the first radio access control unit, wherein the timing of the upcoming gap is autonomously established (331) by the second radio access control unit;

sending, by the radio control unit, a second message (322) to the first radio access control unit, wherein the second message causes adaptation (316) of a planned uplink transmission by the first radio access control unit if (315) a reception by the radio transceiver of an expected response to the planned uplink transmission coincides with the timing of the upcoming gap.

2. The method of example 1 wherein the timing of the upcoming gap is autonomously established by the second radio access control unit to enable one or more of:

reception of a paging message from the second network node;

reception of system information from the second network node;

reception of a data transmission from the second network node;

performing a random access procedure with regard to the second radio access system; and performing, by the second radio access control unit, cell measurements.

3. The method of any of examples 1 through 2 wherein the planned uplink transmission comprises a scheduling request and the expected response comprises a scheduling grant.

4. The method of any of examples 1 through 2 wherein the planned uplink transmission comprises a random access transmission and the expected response comprises a random access response.

5. The method of any of examples 1 through 2 wherein the planned uplink transmission comprises a scheduling request being associated with an expected scheduling grant for a hybrid automatic repeat request—HARQ—data transmission, and the expected response comprises a hybrid automatic repeat request—HARQ—acknowledgement or non-acknowledgement—ACK/NACK.

6. The method of any of examples 3 through 5 wherein the adaptation of the planned uplink transmission comprises cancelling or postponing the planned uplink transmission.

7. The method of any of examples 1 through 2 wherein the planned uplink and the expected response comprises a HARQ acknowledgement or non-acknowledgement—ACK/NACK.

8. The method of example 7 wherein the adaptation of the planned uplink transmission comprises one or more of increasing a transmission power of the planned uplink transmission and using an adjusted transport format for the planned uplink transmission.

9. The method of example 8 wherein the adaptation of the planned uplink transmission comprises using the adjusted transport format for the planned uplink transmission, further comprising transmitting an indication of the adjusted transport format to the first network node.

10. The method of any of example 1 through 9 further comprising:
determining (314, 315), by the radio control unit, whether the reception by the radio transceiver of the expected response to the planned uplink transmission coincides with the timing of the upcoming gap, wherein the second message indicates that the reception by the radio transceiver of the expected response to the planned uplink transmission coincides with the timing of the upcoming gap; and
adapting (316), by the first radio access control unit, the planned uplink transmission in response to receiving the second message.

11. The method of example 10 wherein determining whether the reception by the radio transceiver of the expected response to the planned uplink transmission coincides with the timing of the upcoming gap comprises:
comparing a time until a starting time of the of the upcoming gap with a threshold value, wherein the threshold value is based on a round-trip time between the wireless communication device and the first network node; and
determining that the reception by the radio transceiver of the expected response to the planned uplink transmission coincides with the timing of the upcoming gap if the time until the starting time of the of the upcoming gap is lower than the threshold value.

12. A computer program product comprising a computer readable medium (400), having thereon a computer program comprising program instructions, the execution of the method according to any of examples 1 through 11 when the computer program is run by the data-processing unit.

13. An arrangement for a wireless communication device which comprises a radio transceiver (110) and first (130, 310) and second (140, 330) autonomous radio access control units, wherein the first and second radio access control units are adapted to control operation of the wireless communication device in association with a first network node of a first radio access system and a second network node of a second radio access system, respectively, the arrangement comprising:
a radio control unit (120, 320) adapted to manage time sharing of the radio transceiver by the first and second radio access control units and to, during use of the radio transceiver by the first radio access control unit:
receive a first message from the second radio access control unit, the first message indicative of a timing of an upcoming gap in the use of the radio transceiver by the first radio access control unit, wherein the timing of the upcoming gap is autonomously established by the second radio access control unit;
send a second message to the first radio access control unit, wherein the second message is adapted to cause adaptation of a planned uplink transmission by the first radio access control unit if a reception by the radio transceiver of an expected response to the planned uplink transmission coincides with the timing of the upcoming gap.

14. The arrangement of example 13 wherein the radio control unit (120, 320) is further adapted to determine whether the reception by the radio transceiver of the expected response to the planned uplink transmission coincides with the timing of the upcoming gap, and wherein the second message indicates that the reception by the radio transceiver of the expected response to the planned uplink transmission coincides with the timing of the upcoming gap.

15. The arrangement of any of examples 13 through 14 further comprising the first (130, 310) and second (140, 330) radio access control units.

16. The arrangement of any of examples 13 through 15 further comprising the radio transceiver (110).

17. A wireless communication device comprising the arrangement according to any of examples 13 through 16.

The invention claimed is:

1. A method of a wireless communication device, wherein the wireless communication device comprises:
a radio transceiver;
first and second autonomous radio access control units, wherein the first and second radio access control units are configured to control operation of the wireless communication device in association with a first network node of a first radio access system and a second network node of a second radio access system, respectively; and
a radio control unit configured to manage time sharing of the radio transceiver by the first and second radio access control units;
the method comprising, during use of the radio transceiver by the first radio access control unit:
receiving, by the radio control unit, a first message from the second radio access control unit, the first message indicating a timing of an upcoming gap in the use of the radio transceiver by the first radio access control unit, wherein the timing of the upcoming gap is autonomously established by the second radio access control unit;
determining, by the radio control unit, whether a timing of reception by the radio transceiver of an expected response to a planned uplink transmission by the first radio access control unit coincides with the timing of the upcoming gap; and if so
sending, by the radio control unit, a second message to the first radio access control unit, the second message being configured to cause adaptation of the planned uplink transmission.

2. The method of claim 1, wherein the timing of the upcoming gap is autonomously established by the second radio access control unit to enable one or more of:
reception of a paging message from the second network node;
reception of system information from the second network node;
reception of a data transmission from the second network node;
performing a random access procedure with regard to the second radio access system; and
performing, by the second radio access control unit, cell measurements.

3. The method of claim 1, wherein the planned uplink transmission comprises a scheduling request and the expected response comprises a scheduling grant.

4. The method of claim 1, wherein the planned uplink transmission comprises a random access transmission and the expected response comprises a random access response.

5. The method of claim 1, wherein the planned uplink transmission comprises a scheduling request being associated with an expected scheduling grant for a hybrid automatic repeat request (HARQ) data transmission, and the expected response comprises a (HARQ) acknowledgement or non-acknowledgement (ACK/NACK).

6. The method of claim 3, wherein the adaptation of the planned uplink transmission comprises cancelling or postponing the planned uplink transmission.

7. The method of claim 1, wherein the planned uplink transmission comprises a hybrid automatic repeat request (HARQ) data transmission and the expected response comprises a HARQ acknowledgement or non-acknowledgement (ACK/NACK).

8. The method of claim 7, wherein the adaptation of the planned uplink transmission comprises one or more of increasing a transmission power of the planned uplink transmission and using an adjusted transport format for the planned uplink transmission.

9. The method of claim 8, wherein the adaptation of the planned uplink transmission comprises using the adjusted transport format for the planned uplink transmission, further comprising transmitting an indication of the adjusted transport format to the first network node.

10. The method of claim 1, further comprising:
   determining, by the radio control unit, whether the reception by the radio transceiver of the expected response to the planned uplink transmission coincides with the timing of the upcoming gap, wherein the second message indicates that the reception by the radio transceiver of the expected response to the planned uplink transmission coincides with the timing of the upcoming gap; and
   adapting, by the first radio access control unit, the planned uplink transmission in response to receiving the second message.

11. A method of a wireless communication device, wherein the wireless communication device comprises:
   a radio transceiver;
   first and second autonomous radio access control units, wherein the first and second radio access control units are configured to control operation of the wireless communication device in association with a first network node of a first radio access system and a second network node of a second radio access system, respectively; and
   a radio control unit configured to manage time sharing of the radio transceiver by the first and second radio access control units;
   the method comprising, during use of the radio transceiver by the first radio access control unit:
      receiving, by the radio control unit, a first message from the second radio access control unit, the first message indicating a timing of an upcoming gap in the use of the radio transceiver by the first radio access control unit, wherein the timing of the upcoming gap is autonomously established by the second radio access control unit;
      determining, by the radio control unit, whether a reception by the radio transceiver of an expected response to a planned uplink transmission by the first radio access control unit coincides with the timing of the upcoming gap; and if so
      sending, by the radio control unit, a second message to the first radio access control unit, the second message being configured to cause adaptation of the planned uplink transmission;
   wherein the method further comprises:
      determining, by the radio control unit, whether the reception by the radio transceiver of the expected response to the planned uplink transmission coincides with the timing of the upcoming gap, wherein the second message indicates that the reception by the radio transceiver of the expected response to the planned uplink transmission coincides with the timing of the upcoming gap; and
      adapting, by the first radio access control unit, the planned uplink transmission in response to receiving the second message;
   wherein determining whether the reception by the radio transceiver of the expected response to the planned uplink transmission coincides with the timing of the upcoming gap comprises:
      comparing a time until a starting time of the of the upcoming gap with a threshold value, wherein the threshold value is based on a round-trip time between the wireless communication device and the first network node; and
      determining that the reception by the radio transceiver of the expected response to the planned uplink transmission coincides with the timing of the upcoming gap if the time until the starting time of the of the upcoming gap is lower than the threshold value.

12. A wireless communication device, comprising:
   a radio transceiver;
   first and second autonomous radio access control units, wherein the first and second radio access control units are configured to control operation of the wireless communication device in association with a first network node of a first radio access system and a second network node of a second radio access system, respectively; and
   a radio control unit configured to manage time sharing of the radio transceiver by the first and second radio access control units and to, during use of the radio transceiver by the first radio access control unit:
   receive a first message from the second radio access control unit, the first message indicative of a timing of an upcoming gap in the use of the radio transceiver by the first radio access control unit, wherein the timing of the upcoming gap is autonomously established by the second radio access control unit;
   determine whether a timing of reception by the radio transceiver of an expected response to a planned uplink transmission by the first radio access control unit coincides with the timing of the upcoming gap; and if so
   send a second message to the first radio access control unit, the second message being configured to cause adaptation of the planned uplink transmission.

13. The wireless communication device of claim 12, wherein the radio control unit is further configured to determine whether the reception by the radio transceiver of the expected response to the planned uplink transmission coincides with the timing of the upcoming gap, and, wherein the second message indicates that the reception by the radio transceiver of the expected response to the planned uplink transmission coincides with the timing of the upcoming gap.

14. The wireless communication device of claim 12, further comprising the first and second radio access control units.

15. The wireless communication device of claim 13, further comprising the radio transceiver.

\* \* \* \* \*